United States Patent Office 3,162,662
Patented Dec. 22, 1964

3,162,662
PREPARATION OF LINEAR CHLOROSILOXANES FROM CYCLOTRISILOXANES
Paul L. Brown, Saginaw, and James Franklin Hyde, Midland, Mich., assignors to Dow Corning Corporation, Midland, Mich., a corporation of Michigan
No Drawing. Filed Apr. 19, 1961, Ser. No. 103,978
3 Claims. (Cl. 260—448.2)

This invention relates to the interaction of a halogenosilicon compound with a cyclotrisiloxane to produce linear chlorosiloxanes.

The equilibrium reactions of halogenosilanes with organopolysiloxanes are well-known as evidenced by the disclosure of U.S. Patent 2,421,653. However, this type of reaction has several undesirable features. First, there is always some unreacted halogenosilane and organosiloxane. Second, the equilibrium conditions shown in the art are so severe as to cause the cleavage of radicals such as the phenyl and vinyl radicals from the silicon atoms. For example, where no catalyst is employed, it has been necessary to heat the previously employed reactants under pressure long hours at high temperatures. Where catalysts have been necessary, the recommended hydrogen halide or Lewis acid catalysts presently recognized in the art are well known for rearranging SiOSi bonds as well as cleaving organic radicals from silicon atoms to which they are attached. The search for a non-bond-rearranging catalyst which would bring any halogenosilane-organosiloxane reaction to completion has been intense.

One object of this invention is to provide a method for producing polyfunctional short-chain linear polysiloxanes. Another object is to provide a new method of producing such linear polysiloxanes by interacting a halogenosilane or halogenosiloxane with a cyclotrisiloxane. Another object is to provide a suitable catalytic system for this reaction whereby siloxane-bond-rearrangement and group cleavage are avoided and precise structures are produced. Another object is to provide an essentially acid-free system in which to accomplish this reaction. These objects as well as others which are apparent from the following description are satisfied by this invention.

This invention relates to the method of interacting a silane or siloxane containing at least one silicon-bonded halogen atom per molecule with a diorganocyclotrisiloxane to produce linear chlorosiloxanes.

More specifically, this invention relates to the method which comprises interacting a cyclotrisiloxane A of the formula $(R_2SiO)_3$ in which each R is a substituent independently selected from the group consisting of hydrogen atoms, monovalent hydrocarbon radicals, halogenoaromatic monovalent hydrocarbon radicals, fluoroaliphatic monovalent hydrocarbon radicals and cyanoalkyl radicals with an organosilicon compound B containing from one silicon-bonded halogen atom per molecule to four silicon-bonded halogen atoms per silicon atom, any remaining silicon valences being satisfied by substituents selected from the group consisting of silicon-bonded oxygen atoms and the R substituents set forth above, whereby the cyclotrisilozane A forms a linear siloxane polymer having attached to one terminal silicon atom a halogen atom from B and having attached to the other terminal silicon atom through a siloxane linkage the silicon atom of B from which the halogen atom separated.

Cyclotrisiloxane A can be made up of $R_2SiO$ units in which each R can be, for example, any alkyl radical such as the methyl, ethyl, isopropyl, isobutyl, tert-butyl, 2-ethylhexyl, dodecyl, octadecyl and myricyl radicals; any alkenyl radical such as the vinyl, allyl and hexadienyl radicals; any cycloalkyl radical such as the cyclopentyl and cyclohexyl radicals; any cycloalkenyl radical such as the cyclopentenyl and cyclohexenyl radicals; any aryl hydrocarbon radical such as the phenyl, naphthyl and xenyl radicals; any aralkyl radical such as the benzyl, phenylethyl and xylyl radicals and any alkaryl radical such as the tolyl and dimethylphenyl radicals. These monovalent hydrocarbon radicals can also contain aromatic halogen atoms such as, for example, in the 2,4,6-trichlorobenzyl, perchlorophenyl, 2-bromonaphthyl, p-iodo-phenylethyl and p-fluorophenyl radicals; and aliphatic fluorine atoms such as, for example, in the 3,3,3-trifluoropropyl, $\alpha,\alpha,\alpha$-trifluorotolyl, 3,3,4,4,5,5,5-heptafluoropentyl and 5,5,5-trifluoro-2-trifluoromethylamyl radicals.

In adidtion R can be any cyanoalkyl radical such as the beta-cyanoethyl, gamma-cyanopropyl, omega-cyanobutyl, beta-cyanopropyl, gamma-cyanobutyl and omega-cyanooctadecyl radicals. When such radicals are present, it is preferred that they be attached to at least 1 mol percent of all the silicon atoms in the final compound.

Organosilicon compound B can be a silane containing one, two, three or four halogen atoms or a siloxane containing from one halogen atom per molecule to three halogen atoms per silicon atom. The remaining valences of the silicon valences in compound B can be satisfied by any of the defined R substituents. Compound B can be silane of the formula, for example, $XSiR_3$, $XSiR_2H$, $XSiRH_2$, $XSiH_3$, $X_2SiR_2$, $X_2SiHR$, $X_2SiH_2$, $X_3SiR$, $X_3SiH$ or $X_4Si$ in which each X is a halogen atom and each R is as defined above. Compound B can also be a siloxane made up, for example, of any combination of the following siloxane units: $SiR_3O_{0.5}$, $SiHR_2O_{0.5}$, $SiH_2RO_{0.5}$, $SiH_3O_{0.5}$, $SiR_2O$, $SiHRO$, $SiH_2O$, $SiHO_{1.5}$, $SiRO_{1.5}$, $SiO_2$, $SiR_2XO_{0.5}$, $SiHRXO_{0.5}$, $SiH_2XO_{0.5}$, $SiRXO$, $SiHXO$, $SiXO_{1.5}$, $SiX_2O$, or $SiX_3O_{0.5}$ units in which each X is a halogen atom and each R is as defined above, provided that in any such combination has at least one halogenated siloxane unit in any siloxane employed as compound B.

The primary inventive feature of the method of this invention resides in the claimed interaction without siloxane-bond-rearrangement or cleavage of organic radicals from silicon atoms. In the reaction of this invention the cyclotrisiloxane A forms a linear polymer having attached to one terminal silicon atom a halogen atom from B and having attached to the other terminal silicon atom through a siloxane linkage the silicon atom of B from which the halogen atom separated. The following are some examples of this reaction. In each example each $n$ is 3 or a multiple thereof.

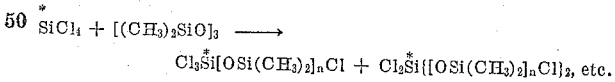

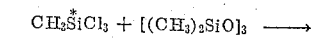

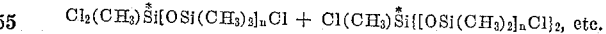

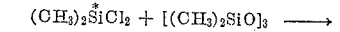

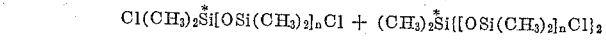

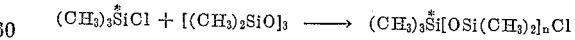

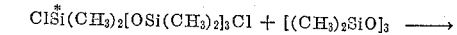

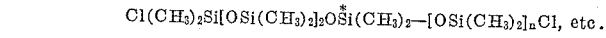

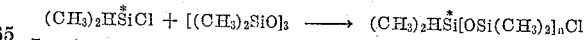

In the above reactions the methyl radicals can be replaced by any other of the above-defined R substituents. Similarly, the chlorine atoms can be replaced by other halogen atoms, e.g., bromine, iodine or fluorine, although chlorine is preferred.

Another inventive feature of the method of this invention is the accomplishment of the interaction of A and B under mild conditions in contact with certain catalysts C.

These catalysts can be amines, amine salts of monocarboxylic acids, amine salts of hydrogen halides, ammonium halides, ammonium salts of monocarboxylic acids, quaternary ammonium salts of monocarboxylic acids, quaternary ammonium halides, amides, alkali metal halides and inert organic solvents having a static dielectric constant greater than 4, preferably greater than 10.

More specifically, these catalysts C include, for example, allylamine, butylamine, amylamine, tri-n-butylamine, tri-amylamine, diphenylamine, dicyclohexylamine, trimethylamine, dimethylamylamine, n-hexylamine, tri-n-propylamine, di-ethylamine, didodecylamine, octadecylamine, 1,2 - dimethyl - 4 - pentenylamine, ethylenediamine, commercial amine mixtures, sym-bis(gamma-aminopropyl)tetramethyldisiloxane, gamma[(β - aminoethyl)amino]propyldiphenylmethylsilane, aniline, benzylamine, di-m-tolylamine, tribenzylamine, 9-phenanthrylamine, N-phenyl-o-phenylenediamine, methylamine 2-ethylhexoate, di-n-propylamine acetate, propylamine hexoate, n-hexylamine acetate, triethylamine formate, di-2-ethylhexylamine acetate, triphenylsilpropylamine formate, trimethylsiloxydimethylsilhexylamine hexoate, tri-n-butylamine acrylate, diethylene triamine monooleate, diisopropylamine palmitate, trimethylamine stearate, 2,5-dimethylpiperazine octoate, di(octadecylamine) sebacate, ethylenediamine di-hexoate, aniline octoate, phenylamine acetate, dibenzylamine 2-ethylhexoate, 3,4-dichloroaniline caproate, p-tolylamine stearate,

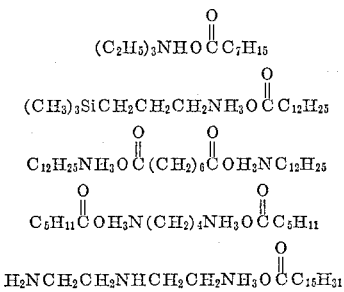

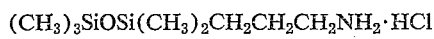

dibutylamine hydrochloride, isopropylamine hydrobromide, dihexylamine hydrochloride, tributylamine hydrobromide, dimethylheptylamine hydrochloride, diphenylamine hydrochloride, benzylamine hydrobromide, $(CH_3)_3SiOSi(CH_3)_2CH_2CH_2CH_2NH_2 \cdot HCl$ ammonium chloride, ammonium stearate, ammonium acetate, tetramethylammonium butyrate, butyltrimethylammonium acetate, tetraethylammonium formate, benzyltrimethylammonium acetate, tetramethylammonium 2-ethylhexoate, distearyldimethylammonium chloride, cetyldimethylbenzyl ammonium chloride, a mixture of dioctadecyldimethylammonium chloride and dihexadecyldimethyl ammonium chloride, commercially available n-alkyltrimethyl ammonium halides, benzyltrimethylammonium chloride, diphenyldimethylammonium iodide, dodecyltrimethylammonium chloride, o-aminoacetanilide, iminodiacetonitrile, m-aminoacetophenone, o-nitroaniline, o-amisidine, 4,4'-diaminoazobenzene, anthranilonitrile, diethylenetriamine, difurfurylamine, histamine, 1-ethyl-2-phenylhydrazine, morpholine, 5 - nitronaphthylamine, piperazine, piperidine, 2-aminopyridine, 6-nitro-o-toluidine, 2-amino-p-tolunitrile, acetamide, N-ethylacetamide, acetanilide, adalin, m-nitrobenzanilide, ethyl carbamate, methylurethane, cinnamamide, cyanamide, diacetamide, formamide, N,N-diphenylformamide, N,N-dimethylformamide, formohydrazide, 1,1,3,3 - tetraphenylguanidine, malonamide, myristamide, 2-naphthamide N-acetyl-2-naphthylamine, oleamide, phenocoll, phthalamide, 1-formyl-piperidine, m-toluamide, urea, N-allyl-N'-phenylurea, sodium chloride and potassium bromide.

The amount of these catalysts C is not critical although from about 0.1 to about 2 percent by weight based on the combined weight of A and B is preferred. Less than about 0.1 percent of catalyst is impractical due to reduction of reaction rate. More than about 2 percent by weight of catalyst is unnecessary but can be employed.

The method of this invention is also catalyzed by the use of liquid inert polar organic compounds as solvents. One measure of polarity is the static dielectric constant. Liquid hydrocarbons have static dielectric constants of less than about 3. Halogenated liquid hydrocarbons as well as ethers generally have static dielectric constants greater than 4. The introduction into the molecular structure of these polar compounds of nitrogen atoms as in nitrile groups, nitro groups and amide groups raises the static dielectric constants of such compounds to above 10. The term "inert" means sufficiently inactive to components A and B not to interfere with their reaction and excludes such functions as, for example, the hydroxyl group, the thiol group and ketones which enolize to give hydroxyl groups.

For this invention a suitable liquid inert polar organic compound is one which has a static dielectric constant greater than about 4 and preferably greater than 10. Such compounds include, for example, chloroform, bromoform, dichloromethane, iodomethane, dibromomethane, 1,1,1-trichlorethane, o-dibromobenzene, p-fluorotoluene, methylbutyl ether, the dimethyl ether of ethylene glycol, tetrahydrofuran, β,β'-dichlorodiethylether, acetonitrile, propionitrile, butyronitrile, valeronitrile, benzonitrile, cyclohexonitrile, capronitrile, succinonitrile, ethoxyacetylene, pyridine, nitromethane, nitroethane, nitropropane, nitrooctane, nitrobenzene, nitrotoluene, nitrocyclohexane, 1-chloro-2-nitrobenzene, formamide, acetamide, dimethylformamide, dimethylacetamide, tetramethylurea and ethyl carbamate.

The amount of liquid inert polar organic compound employed as a catalyst C is not critical although generally at least about 10 percent by weight of the compound based on the combined weight of A and B should be employed. More than about 100 percent by weight of the compound based on the combined weight of A and B is wasteful but can be employed.

The method of this invention can be done in a solvent-free state, in non-catalytic solvents such as benzene, hexane, toluene, xylene and the like, or in polar solvents as described above. Combinations of compounds operative as catalyst C can be employed.

The method of this invention can operate at room temperature or higher. However, generally temperatures of more than about 150° C. are not desirable.

The method of this invention is useful for introducing functionality in the form of silicon-bonded halogen atoms into molecules where no such functionality previously existed. Thus, a non-functional cyclic trisiloxane can be converted to an active material useful, for example, as a cross-linking agent in a rubber or resin. The method of this invention is useful for building more precise organosilicon structures not possible in the presence of siloxane-bond-rearranging catalysts. The halogen endblocked compositions produced are especially useful as intermediates in the preparation of precise resinous and elastomeric polymeric structures.

The following examples are illustrative of the best method of practicing this invention but are not intended to limit this invention the scope of which is properly delineated in the claims. The symbols, Me, Et, Vi and Ph represent the methyl, ethyl, vinyl and phenyl radicals.

EXAMPLE 1

100 grams of hexamethylcyclotrisiloxane, 77 grams of tetrachlorosilane, 20 grams of acetonitrile and about one gram of dimethylformamide were mixed together in a closed system, i.e., a capped bottle, for one hour at room temperature. The product was distilled and was found to contain a good yield of Cl$_3$Si(OSiMe$_2$)$_3$Cl (boiling point of 42° C. at 0.15 mm. Hg) verified by its infrared spectrum.

EXAMPLE 2

Mixtures of 50 grams of hexamethylcyclotrisiloxane and 7.3 grams of silicon tetrachloride were mixed with each of the catalysts shown. After standing 36 hours at room temperature in closed systems the products in each case were found by infrared analysis to contain no hexamethylcyclotrisiloxane showing complete reaction of this component.

*Table I*

| Run | | MeCN | $\overset{O}{\underset{\|}{HCNMe_2}}$ | $NH_4Br$ | $\overset{O}{\underset{\|}{MeCNMe_2}}$ |
|---|---|---|---|---|---|
| I | g | 23.4 | | | |
| II | g | 11.75 | 0.34 | | |
| III | g | 11.75 | | 1 | |
| IV | g | 23.4 | | | 0.5 |

EXAMPLE 3

408 grams of sym-trimethyltriphenylcyclotrisiloxane, 170 grams of tetrachlorosilane, 78.3 grams of acetonitrile and 10 grams of dimethylformamide were refluxed together for 60 hours in a closed system. The product was stripped of catalysts and any remaining chlorosilane at 180° C. and 0.5 mm. Hg pressure. The residue was a mixture of reaction products of the tetrachlorosilane and the cyclotrisiloxane consisting primarily of $$Cl_3Si(OSiPhMe)_3Cl$$

and $Cl_2Si[(OSiPhMe)_3Cl]_2$ and containing 18.25 percent by weight chlorine. $Cl_3Si(OSiPhMe)_3Cl$ has the following properties: boiling point 106° C. at 0.15 mm. Hg; $d_4^{25}$ 1.1865; $n_D^{25}$ 1.5250.

EXAMPLE 4

A mixture of 444 grams of hexamethylcyclotrisiloxane, 423 grams of monophenyltrichlorosilane, 78.3 grams of acetonitrile and 0.17 gram of dimethyl formamide was heated in a closed system at 70° C. for 72 hours. The resulting product was stripped of catalysts and any remaining chlorosilane at 135° C. and 2 mm. Hg pressure. The residue was a mixture of reaction products of the silane and cyclotrisiloxane consisting primarily of $$Cl_2SiPh(OSiMe_2)_3Cl$$

and $ClSiPh[(OSiMe_2)_3Cl]_2$ and containing 18.1 percent by weight chlorine.

EXAMPLE 5

A mixture of 408 grams of sym-triphenyltrimethylcyclotrisiloxane, 211.5 grams of monophenyltrichlorosilane, 39.1 grams of acetonitrile and 0.17 gram of dimethylformamide was heated in a closed system at 70° C. for 72 hours. The resulting product was stripped of catalysts and any remaining chlorosilane at 155° C. and 0.3 mm. Hg pressure. The residue was a mixture of reaction products of the silane and the cyclotrisiloxane consisting primarily of $ClSiPh[OSiPhMe)_3Cl]_2$ and containing 16.3 percent by weight chlorine.

EXAMPLE 6

Two mixtures each composed of 222 grams of hexamethylcyclotrisiloxane, 78.3 grams of acetonitrile and 10 grams of dimethylformamide were mixed, one with 126 grams of diphenyldichlorosilane and the other with 95.5 grams of phenylmethyldichlorosilane. Each mixture was allowed to stand in a closed system at room temperature, the first mixture for 22 hours and the second mixture for 45 hours, after which all unreacted components were stripped off. The stripped residues were mixtures of the reaction products of the cyclotrisiloxane and the respective silanes. The first residue consisted of a mixture of chlorine-endblocked linear copolymers of diphenylsiloxane units and dimethylsiloxane units and had a viscosity at 25° C. of 14.49 cs. This residue contained 8.08 percent by weight chlorine equivalent to an average of about 9.5 silicon atoms per molecule. The second residue consisted of a mixture of chlorine-endblocked linear copolymers of phenylmethylsiloxane units and dimethylsiloxane units and had a viscosity at 25° C. of 6.71 cs. This residue contained 9.91 percent by weight chlorine equivalent to an average of about 8.1 silicon atoms per molecule.

EXAMPLE 7

The following mixtures were refluxed for approximately 16 hours.

*Table II*

| Mixture | | $(Me_2SiO)_3$ | $Me_3SiCl$ | $Ph_2MeSiCl$ | MeCN | $\overset{O}{\underset{\|}{HCNMe_2}}$ |
|---|---|---|---|---|---|---|
| A | g | 111 | 60 | | 31.3 | 1 |
| B | g | 100 | | 116 | 39.1 | 1 |

Each system was then stripped of unreacted components. There was no hexamethylcyclotrisiloxane detected in the volatile materials. The residue from mixture A was a mixture of polymers of the formula $$Me_3Si(OSiMe_2)_nCl$$

and contained 3.36 percent by weight chlorine equivalent to an average value for $n$ of 12.8 where each $n$ is a multiple of 3. The residue from mixture B was a mixture of polymers of the formula $Ph_2MeSi(OSiMe_2)_nCl$ containing 4.12 percent by weight chlorine equivalent to an average value for $n$ of 10.1 where each $n$ is a multiple of 3.

EXAMPLE 8

444 grams of hexamethylcyclotrisiloxane, 182 grams of gamma-cyanopropylmethyldichlorosilane, 78.3 grams of acetonitrile and 10 grams of dimethylformamide were heated together in a closed system for 72 hours at 75° C. The resulting product was diluted with ether, hydrolyzed in the presence of $Na_2CO_3$, washed and stripped of solvent and unreacted components of the mixture at 120° C. and 6 mm. Hg pressure. The residue consisted of a mixture of linear copolymers of dimethylsiloxane units and gamma-cyanopropylmethylsiloxane units. This copolymer mixture had a viscosity of 40.85 cs. at 25° C. and contained approximately 3.2 percent by weight silicon-bonded hydroxyl groups and 2.4 percent by weight nitrogen.

EXAMPLE 9

A mixture of 222 grams of hexamethylcyclotrisiloxane, 94.5 grams of $Me_2HSiCl$, 39.1 grams of acetonitrile and 2.4 grams of dimethylformamide was stirred at room temperature for 68 hours after which infrared analysis showed at most a trace of hexamethylcyclotrisiloxane remaining in the reaction mixture. The product was a mixture of compounds of the general formula $Me_2HSi(OSiMe_2)_xCl$ in which $x$ has an average value of about 4.5. This indicates an approximately equal mixture of $$Me_2HSi(OSiMe_2)_3Cl$$

and $Me_2HSi(OSiMe_2)_6Cl$. The product was verified by mixing it with an excess of $Me_3SiCl$ and adding the mixture to a slurry of toluene, acetonitrile and sufficient ZnO to condense all the silicon-bonded chlorine. The product mixture was filtered, the filtrate washed and the washed filtrate stripped to 80° C. vapor temperature at 6 mm. of Hg. The product was 2.32 cs. fluid containing about 2.1 percent by weight silicon-bonded hydrogen. Infrared analysis showed approximately 18 percent by weight trimethylsiloxane units in the product. This corresponds to a product of the general formula $$Me_2HSi(OSiMe_2)_xOSiMe_3$$

in which $x$ has an average value of about 4.5.

EXAMPLE 10

Similar results are obtained when 30 grams of each of the following solvents is substituted for the 20 grams of acetonitrile in Example 1: o-dibromobenzene, methylbutylether, benzonitrile, pyridine, nitroethane, nitrotoluene, tetramethylurea, chloroform and ethylene glycol dimethylether.

EXAMPLE 11

Similar results are obtained when 0.4 gram of each of the following catalysts is substituted for the one gram of dimethylformamide in Example 1: trimethylamine, n-hexylamine, dibutylamine, finely divided sodium chloride, tetra-n-butylammonium iodide, tetraethylammonium bromide, ethylene diamine, n-hexylamine hydrochloride, di-n-propylamine hydrobromide, diethylamine acetate, methylamine 2-ethylhexoate, aniline, tribenzylamine, di-m-tolylamine aniline octoate, dibenzylamine 2-ethylhexoate, p-tolylamine stearate, diphenylamine hydrochloride, tetramethylammonium butyrate, benzyltrimethylammonium chloride, ammonium stearate, ammonium propionate, piperazine, acetamide, urea and 1,1,3,3-tetraphenylguanidine.

EXAMPLE 12

When the following mixtures of cyclotrisiloxanes A and and compounds B are each mixed with 30 parts by weight of acetonitrile and 0.5 part by weight of dimethylformamide and are allowed to stand at room temperature in a closed system for 115 hours, the identifiable product shown is produced showing that a reaction has taken place between A and B, whereby the cyclotrisiloxane A forms a linear siloxane polymer having attached to one terminal silicon atom a halogen atom from B and having attached to the other terminal silicon atom through a siloxane linkage the silicon atom of B from which the halogen atom separated.

*Table III*

| A | Parts by Wt. | B | Parts by Wt. | Product |
|---|---|---|---|---|
| $(Et_2SiO)_3$ | 60 | $C_{18}H_{37}SiBr_3$ | 20 | $C_{18}H_{37}SiBr_2(OSiEt_2)_3Br$ |
| $(CF_3CH_2CH_2SiMeO)_3$ | 66 | $CF_3CH_2CH_2SiCl_3$ | 16 | $CF_3CH_2CH_2SiCl_2[OSiMe(CH_2CH_2CF_3)]_3Cl$ |
| $(Cl_2C_6H_3SiMeO)_3$ | 86 | $BrC_6H_4SiCl_3$ | 20 | $BrC_6H_4SiCl_2[OSiMe(C_6H_3Cl_2)]_3Cl$ |
| $(C_6H_5CH_2SiMeO)_3$ | 62 | $ViSiCl_3$ | 10 | $ViSiCl_2[OSiMe(CH_2C_6H_5)]_3Cl$ |
| $(C_{18}H_{37}SiMeO)_3$ | 64 | $C_6H_{11}SiCl_3$ | 7 | $C_6H_{11}SiCl_2[OSiMe(C_{18}H_{37})]_3Cl$ |
| $(MeViSiO)_3$ | 64 | $MeSiCl_3$ | 8 | $MeSiCl_2(OSiMeVi)_3Cl$ |
| $(Me_2SiO)_3$ | 64 | $HSiCl_3$ | 10 | $HSiCl_2(OSiMe_2)_3Cl$ |
| $(NCCH_2CH_2SiMeO)_3$ | 64 | $Cl[SiMe_2O]_5SiMe_2Cl$ | 20 | $Cl[SiMe_2O]_5SiMe_2[OSiMe(CH_2CH_2CN)]_3Cl$ |

EXAMPLE 13

A mixture of 150 grams of methyltrichlorosilane, 111 grams of hexamethylcyclotrisiloxane, 15.7 grams of acetonitrile and 2.8 grams of dimethylformamide was shaken for about 168 hours at room temperature and distilled. The principal product was $$Cl_2SiMe(OSiMe_2)_3Cl$$

having a boiling point of 50° C. at 0.3 mm. Hg.

EXAMPLE 14

A mixture of 42.5 grams of tetrachlorosilane and 74 grams of hexamethylcyclotrisiloxane was heated in a closed vessel for 2 hours at 150° C. and distilled. After unreacted tetrachlorosilane was removed, the remaining product was a mixture of reaction products including $Cl_3Si(OSiMe_2)_6Cl$ and $Cl_2Si[(OSiMe_2)_3Cl]_2$.

EXAMPLE 15

When 90 grams of $(MeHSiO)_3$ is added slowly to 170 grams of tetrachlorosilane and the mixture is agitated for 24 hours at room temperature, the principal product after distilling off unreacted tetrachlorosilane is $$Cl_3Si(OSiHMe)_3Cl.$$

EXAMPLE 16

A mixture of 111 grams of hexamethylcyclotrisiloxane, 232.5 grams of diphenylmethylchlorosilane and 0.5 grams of cetyldimethylbenzylammonium chloride was refluxed for 40 hours after which the unreacted cyclic siloxane and chlorosilane were stripped off to 175° C. at 1.5 mm. Hg. The product containing 4.55 percent by weight chlorine was primarily a mixture of $MePh_2Si[OSiMe_2]_6Cl$ and $MePh_2Si[OSiMe_2]_9Cl$.

That which is claimed is:

1. The method which comprises interacting a mixture which consists essentially of a cyclotrisiloxane A of the formula $(R_2SiO)_3$ in which each R is a substituent independently selected from the group consisting of hydrogen atoms, monovalent hydrocarbon radicals, halogenoaromatic monovalent hydrocarbon radicals, fluoroaliphatic monovalent hydrocarbon radicals and cyanoalkyl radicals and an organosilicon compound B containing from one silicon-bonded halogen atom per molecule to four silicon-bonded halogen atoms per silicon atom, any remaining silicon valences being satisfied by substituents selected from the group consisting of silicon-bonded oxygen atoms and the R substituents set forth above, whereby the cyclotrisiloxane A forms a linear siloxane polymer having attached to one terminal silicon atom a halogen atom from B and having attached to the other terminal silicon atom through a siloxane linkage the silicon atom of B from which the halogen atom separated.

2. The method which comprises interacting a mixture which consists essentially of a cyclotrisiloxane A of the formula $(R_2SiO)_3$ in which each R is a substituent independently selected from the group consisting of hydrogen atoms, monovalent hydrocarbon radicals, halogenoaromatic monovalent hydrocarbon radicals, fluoroaliphatic monovalent hydrocarbon radicals and cyanoalkyl radicals and an organosilicon compound B containing from one silicon-bonded halogen atom per molecule to four silicon-bonded halogen atoms per silicon atom, any remaining silicon valences being satisfied by substituents selected from the group consisting of silicon-bonded oxygen atoms and the R substituents set forth above, in contact with a catalyst C selected from the group consisting of amines, amine salts of monocarboxylic acids, amine salts of hydrogen halides, ammonium halides, ammonium salts of monocarboxylic acids, quaternary ammonium salts of monocarboxylic acids, quaternary ammonium halides, amides, alkali metal halides and liquid inert organic compounds, other than those above, having a static dielectric constant greater than 4, whereby the cyclotrisiloxane A forms a linear siloxane polymer having attached to one terminal silicon atom a halogen atom from B and having attached to the other terminal silicon atom through a siloxane linkage the silicon atom of B from which the halogen atom separated.

3. $Cl_3Si[OSi(C_6H_5)(CH_3)]_3Cl.$ (Other references on following page)

References Cited in the file of this patent

UNITED STATES PATENTS

| | | | |
|---|---|---|---|
| 2,381,366 | Patnode | Aug. 7, | 1945 |
| 2,421,653 | Sauer | June 3, | 1947 |
| 2,519,881 | Brewer | Aug. 22, | 1950 |
| 2,902,507 | Hyde et al. | Sept. 1, | 1959 |
| 2,911,427 | Brown | Nov. 3, | 1959 |
| 2,981,746 | Cohen | Apr. 25, | 1961 |
| 3,065,252 | Brown et al. | Nov. 20, | 1962 |
| 3,101,361 | Brown et al. | Aug. 20, | 1963 |

FOREIGN PATENTS

| | | | |
|---|---|---|---|
| 1,030,346 | Germany | May 22, | 1958 |

OTHER REFERENCES

Daudt et al., "Jour. Am. Chem. Soc.," volume 74 (1952), pages 386–90.

Andrianov et al. (I), "Doklady Akad. Nauk. SSSR," vol. 134 (October 1960), pp. 1347–9 (55 Chem. Abstracts 9264d).

Andrianov et al. (I), "Izvestia Akad. Nauk. SSSR," (August 1961), pp. 1456–61 (56 Chem. Abstracts 494c).

Eaborn, "Organosilicon Compounds," Academic Press, Inc., New York, pub. (1960), pp. 230–1.